United States Patent [19]
Eskijian

[11] 3,758,957
[45] Sept. 18, 1973

[54] WET FILM THICKNESS GUAGE

[76] Inventor: Luther Eskijian, 2223 Midlothian Dr., Altadena, Calif.

[22] Filed: Apr. 6, 1972

[21] Appl. No.: 241,502

[52] U.S. Cl. ............................................. 33/169 F
[51] Int. Cl. ............................................. G01b 3/28
[58] Field of Search ............... 33/169 B, 169 R, 33/169 F, 170 R

[56] References Cited
UNITED STATES PATENTS

| | | | |
|---|---|---|---|
| 2,167,652 | 8/1939 | Hoch | 33/169 F |
| 2,136,675 | 11/1938 | Danse | 33/170 |
| 1,922,895 | 8/1933 | Lemaire | 33/169 B |
| 3,168,784 | 2/1965 | Morrissey | 33/169 F |
| 1,927,821 | 9/1933 | Abbott | 33/169 F |
| 3,093,908 | 6/1963 | Rabinow | 33/169 F |

*Primary Examiner*—Harry N. Haroian
*Attorney*—William W. Haefliger

[57] ABSTRACT

An instrument having adjustment provision in the form of a threaded shank portion used to feel the Wet Film surface, and which moves to a selective degree outward or inward relative to a pair of astriding penetration forks, including a rotational gauge member calibrated to record said Wet Film thickness.

1 Claim, 3 Drawing Figures

PATENTED SEP 18 1973   3,758,957
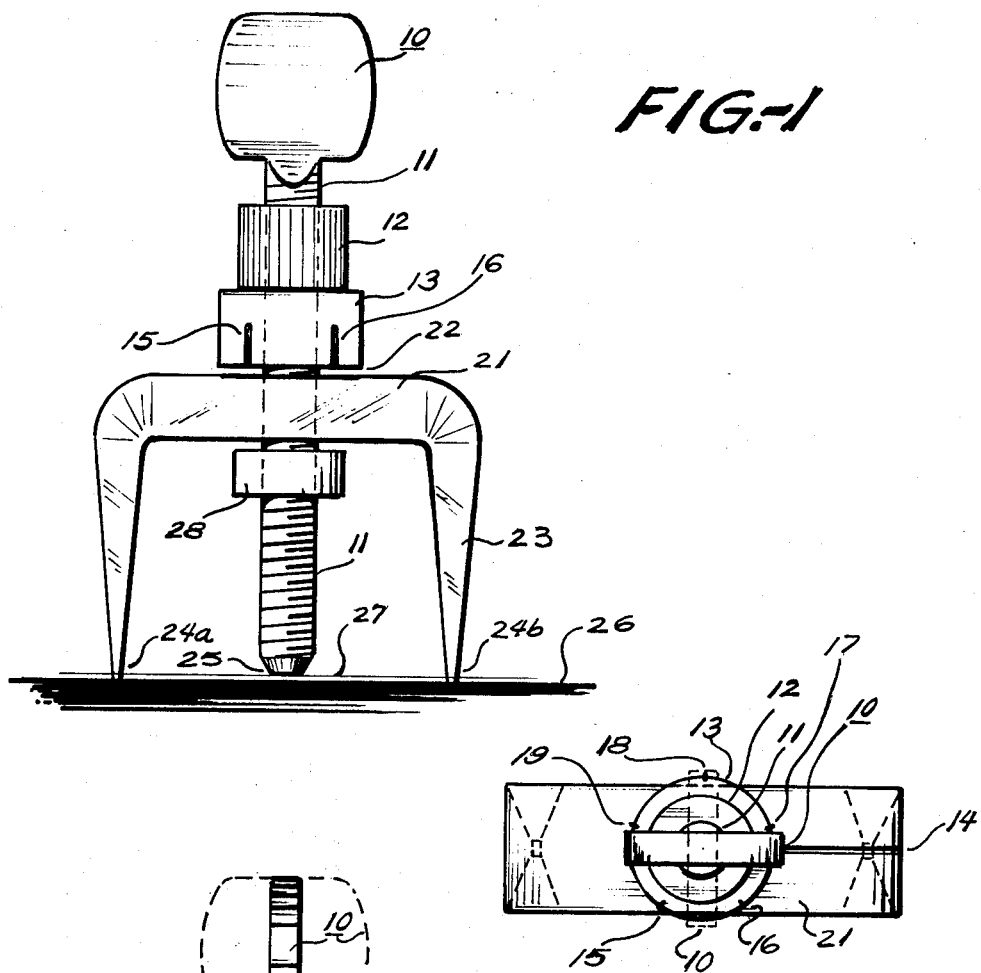
FIG.-1
FIG.-2
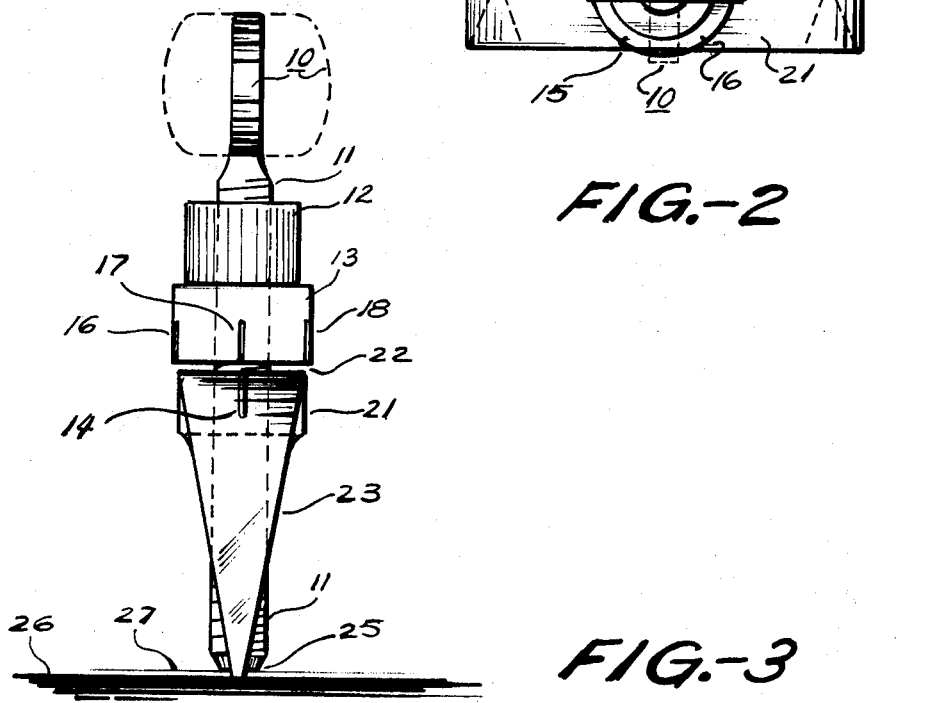
FIG.-3

WET FILM THICKNESS GUAGE

This invention disclosure relates to instruments used in the measurement of "wet films", a term being defined herein as the condition of a protective coating prior to its having achieved a dried or hardened state. Thus, as used on equipment surfaces of various types, this wet film is mechanically or hand applied as a protective coating for corrosion prevention. To ascertain the degree of protective film having been applied, wherein the applier or inspector has heretofore been required to sample an area with gauges that do not give him resulting information with which he can adjust to immediately or thereby control his operations without necessitating additional labor to determine if he has achieved satisfactory thickness according to predetermined specifications which generally will include a lining or coating ranging from a few mils to many mils of thickness. Thus, in order to alleviate this inspection nuisance and to improve accuracy of inspection readings, the invention provides a number of distinct functional advantages.

Therefore, it is an object of this invention to provide a more compatible means of determining film thickness after the coating has been applied and while it is still wet.

It is also an object of this invention to determine a wet film thickness as a guide for the coating applicator to obtain frequent sampling while working to insure thickness according to established specifications.

It is also an object of this invention to provide an instrument with variable adjustment for exact mil thickness ratings.

It is also an object of this invention to exhibit calibrations on a portion of the main body so that a second gauge need not be required in reading or setting of the subject wet film thickness.

It is also an object of this invention to include a threaded portion which can be calibrated in degree of turns to the desired mil thickness through actual counting of rotations made by the threaded shank member.

It is also an object of this invention to provide a locking member for the purpose of maintaining a specific setting.

It is also an object of this invention to include a calibrated gauge nut or similar threaded device which supplies a ready reference means of reading through a series of equal flat areas or equivalent marked intervals so as to permit exact correlation of mil thickness with the particular pitch angle of threaded shank being used.

It is also an object of this invention to provide a slight resistance to the interacting threaded shank and body members so as to permit response only to firm adjustments.

The above and other features of this invention reside in its adaptability to convenient and economical manufacture. With the foregoing more prominent objects and features in mind, other points of importance may become apparent as this specification proceeds. The following text will be more fully comprehended with the aid of the enumerated illustrations taken in conjunction with like characters of reference used to designate like parts, and wherein:

FIG. 1) is a broad-side elevation view showing the invention relative to a working surface.

FIG. 2) is a plan-view of the invention as viewed from the upper turn-knob portion.

FIG. 3) is a narrow-side elevation view showing the invention in further detail.

Reference is next given to the drawings of FIG. 1 showing the invention as it would preferably appear, wherein 10 is the thumb and index finger operated turn knob having an integral precision male threaded shank 11 upon which is carried a female threaded lock nut member 12 which acts against the calibrated gauge nut 13 also having female threads along with sides which preferably include symbols of any convenient configuration which serve to correlate the said thread pitch with a percentage of mil thickness measurement. For example, in FIG. 2 an exemplary reference mark 14 on body 21 also shown in FIG. 3 provides a station point from which the user may count said symbols which could be applied to read from the periphery of nut 13; thus turning knob 10 relative to precision flat 20 of probe body 21 and reference mark 14 thereon only two symbol spaces would correlate to the user that the change in gap width at point 22 interjacent to said members 13 and 21, equals 2-mils thickness or two-thousandths part of the inch, for example. Thus, while the particular equation factor may vary according to that preferred by a certain manufacturer, the principle remains the same as described.

An alternate method of extrapolating a reading from the said gap 22 is through use of the standard feeler gauge method which being less convenient, nevertheless offers an equivalent degree of accuracy.

Construction of rocker body 21 may be cast or fabricated of rolled or extruded material such as square tubing sliced into narrow annular squares which are then cut in half to produce two duplicate U-shaped parts of which only one is required per assembly of the invention. The legs or prongs of this said part 21 are then shaped to a tapered section as illustrated in typical region 23 which leads to a tiny flat or penetration tip 24$a$ and 24$b$. Although no specific dimensions are herein called for, a grasp of the relative scale and proportions required may be acquired by viewing the drawings of the invention as representing that of a tool or instrument which is to be engineered for operation by the human hand. The visual sighting terminal or tip 25 is also made with a precision flat surface which must be made only large enough to facilitate accurate sighting while covering a minimum of area, and made perpendicular to the axis of said member 11 and integral therewith, said flat being usually about three sixteenths part of the inch in breadth. An auxilary lock member 28 may be included to serve as a lower end limit-stop and may include a similar readout system to that described for member 13. A slight degree of built-in resistance to free turning shall preferably be made in the interactions of the entire threading system so as to alleviate any inadvertent change in setting other than that purposely applied by the operator.

In actual operation following the preferred manner of use, the instrument is first calibrated so that when members 12 and 13 are adjusted to be flush with the top of the rocker body 21 the end of the visual sighting tip 25 is in line with the two tips 24$a$, 24$b$; thus visually forming a single plane of alignment, with nut 28 moved out of range, then knob 10 is rotated until the said tip 25 is substantially clear of the working surface 26. When the said surface 26 is prepared and wet with a film 27 to be measured as to depth or thickness, the operator has but to place the instrument perpendicularly to the surface with probes 24a, 24b through the said wet film 27 upon surface 26 whereupon knob 10 is slowly rotated until the tip 25 is just touching upon the outer film surface 27 as visually perceived by the instrument operator; the object herein being not to depress the film surface 27 to any marked degree although physical contact must be witnessed. Subsequent removal of the instrument and measurement of the resulting gap 22 is equivalent to the true thickness of the wet film 27 being tested or gauged, as it were. When this setting is to be retained, then bring nut 28 up tight against the body to hold member 11 from turning. Likewise, instrument can be used in a reverse manner, by setting the feeler tip 25 at a given distance from the surface 26, in order to observe if the coating is more or less that which is specified and set on the gauge, whereupon the applicator can make the corrections of the mil thickness while he is still in the process of application. Using either of these two reference gauge members, the measuring process may be repeated as required, all the while producing a minimum of detrimental effect upon the natural unblemished appearance of the coated surface.

While the foregoing serves to illustrate and describe the preferred embodiment of the invention, various modifications may become apparent to those skilled in the art to which the invention relates; accordingly, it is imprudent to limit the invention to the disclosure revealed herein, as it is desired that various modifications and equivalents be resorted to which fall within the spirit and scope of the invention as claimed:

I claim the following:

1. An instrument for the measurement of "wet film" thicknesses comprising:
   a. a body having two laterally spaced longitudinally projecting prongs provided with end tips,
   b. an externally threaded shank projecting longitudinally generally between said prongs, the shank having an end terminal, the shank also having rotatably adjustable threaded interfit with said body to project therethrough and to be advanced relatively longitudinally for bringing said terminal into touching engagement with the exposed surface of a wet film applied to a support surface while said tips are in engagement with said support surface,
   c. there being a rotatably adjustable nut having an internal thread interfitting the shank thread, and precision flats on the nut and on that side of the body which is longitudinally opposite said terminal, said flats defining a measuring gap therebetween corresponding to the film thickness when said terminal is advanced into said touching engagement with the film, and
   d. there being sufficient frictional interference between the nut and shank threads as to resist inadvertent nut rotation on the shank.

* * * * *